Figure 6:
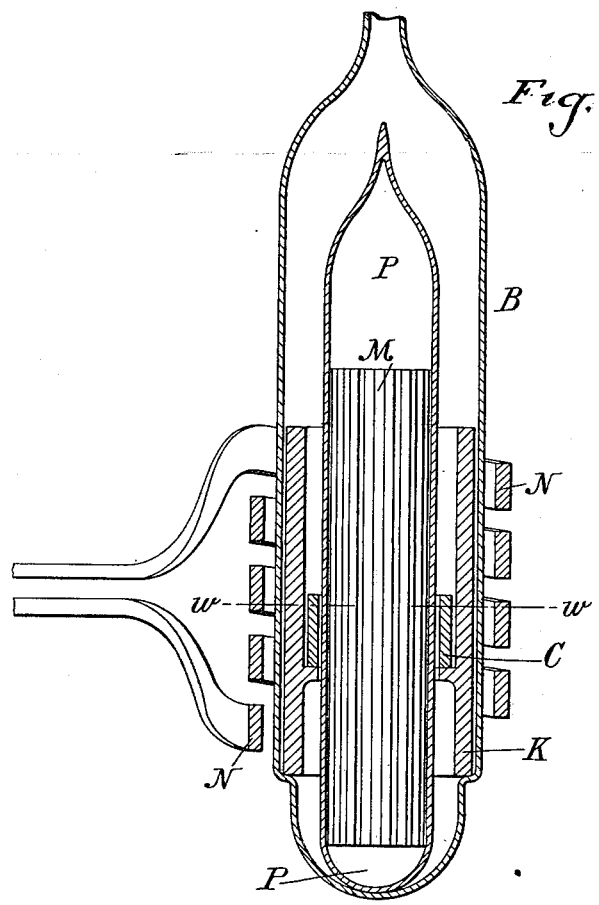

No. 859,021. PATENTED JULY 2, 1907.
F. SODDY.
MEANS AND APPARATUS FOR PRODUCING HIGH VACUUMS.
APPLICATION FILED JULY 13, 1906.
5 SHEETS—SHEET 1.
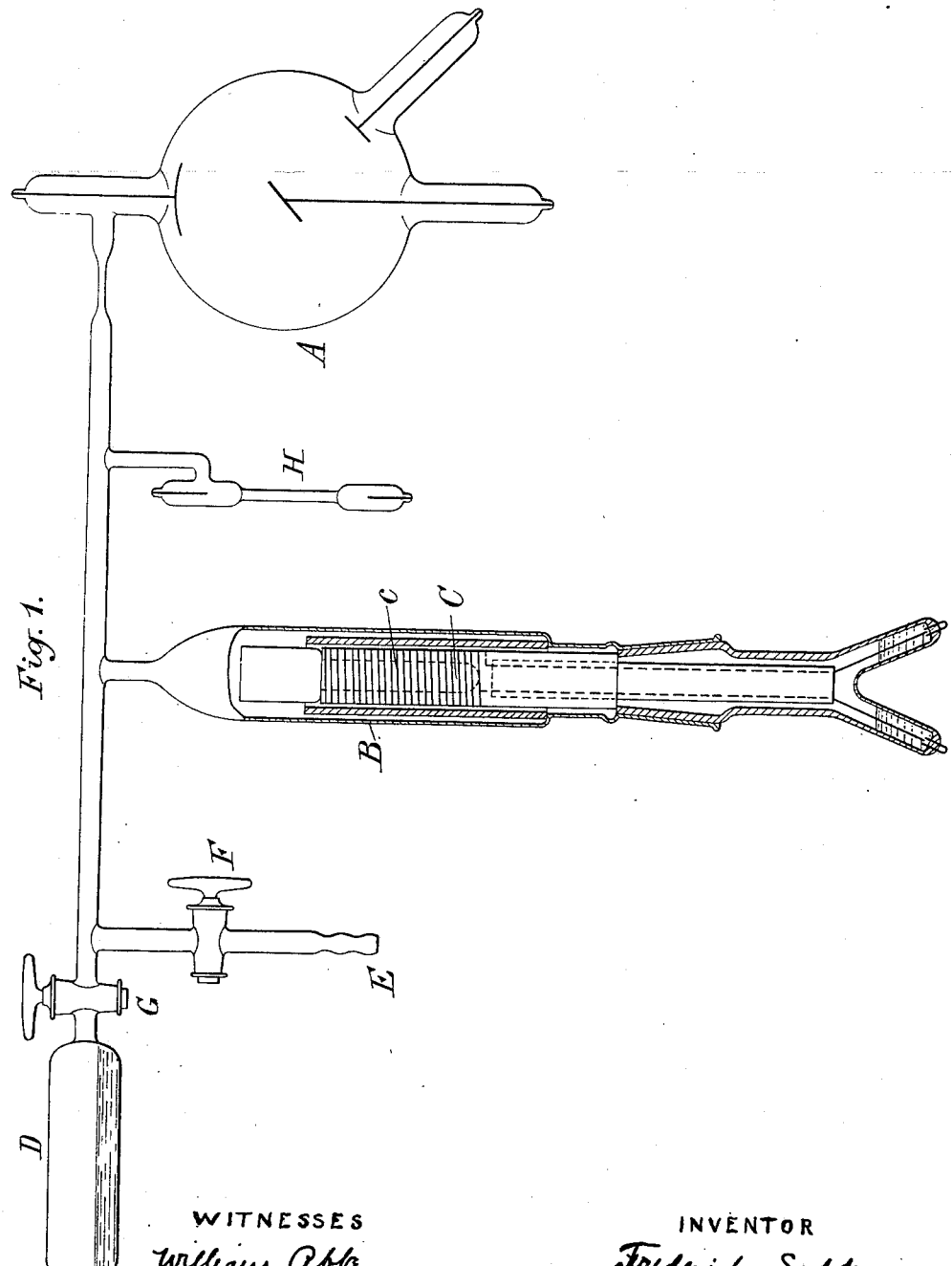

No. 859,021. PATENTED JULY 2, 1907.
F. SODDY.
MEANS AND APPARATUS FOR PRODUCING HIGH VACUUMS.
APPLICATION FILED JULY 13, 1906.
5 SHEETS—SHEET 2.
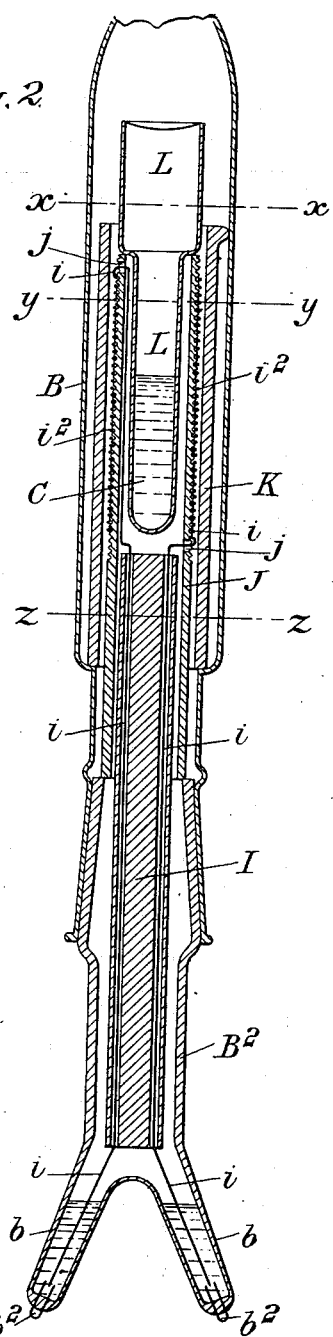
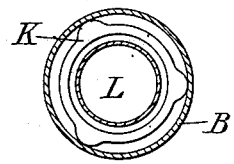
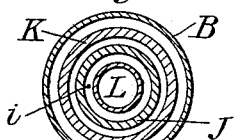
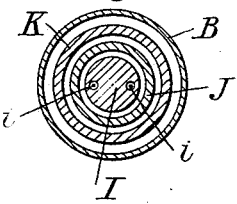
WITNESSES
William Abb
E. W. Collins
INVENTOR
Frederick Soddy
by Howson and Howson
Attys No. 859,021. PATENTED JULY 2, 1907.
F. SODDY.
MEANS AND APPARATUS FOR PRODUCING HIGH VACUUMS.
APPLICATION FILED JULY 13, 1906.

5 SHEETS—SHEET 3.

WITNESSES
William Abbe
E. W. Collins

INVENTOR
Frederick Soddy
by Howson and Howson
Attys

No. 859,021. PATENTED JULY 2, 1907.
F. SODDY.
MEANS AND APPARATUS FOR PRODUCING HIGH VACUUMS.
APPLICATION FILED JULY 13, 1906.

5 SHEETS—SHEET 4.

WITNESSES
William Abk
E. W. Collins

INVENTOR
Frederick Soddy
by Howson and Howson
Attys.

No. 859,021. PATENTED JULY 2, 1907.
F. SODDY.
MEANS AND APPARATUS FOR PRODUCING HIGH VACUUMS.
APPLICATION FILED JULY 13, 1906.

5 SHEETS—SHEET 5.

WITNESSES
William Abb
E. W. Collins

INVENTOR
Frederick Soddy
by Howson and Howson
Att'ys

UNITED STATES PATENT OFFICE.

FREDERICK SODDY, OF GLASGOW, SCOTLAND.

MEANS AND APPARATUS FOR PRODUCING HIGH VACUUMS.

No. 859,021.     Specification of Letters Patent.     Patented July 2, 1907.

Application filed July 13, 1906. Serial No. 326,159.

*To all whom it may concern:*

Be it known that I, FREDERICK SODDY, a subject of the King of Great Britain and Ireland, residing at 46 Kersland street, Glasgow, Scotland, lecturer of chemistry in the University of Glasgow, have invented certain new and useful Improvements in Means and Apparatus for Producing High Vacua, of which the following is a specification.

The object of this invention is to obtain a high vacuum in a rapid and economical manner without the use of the mercury pump, but of a degree of rarefaction fully equal to that which can be produced by the mercury pump under the most favorable conditions.

The process employed depends on the absorption by highly heated reagents of the gases remaining after preliminary exhaustion by means of mechanical air pumps or any other means. In the production of high vacua not only has the air to be removed but also the gases occluded or condensed on the walls of the vessel being exhausted and on the contained electrodes or filaments or other contents of the said vessel, which condensed gases are given up slowly after exhaustion and if not removed during the exhaustion cause the vacuum to deteriorate.

I have discovered that certain reagents, hereinafter described, will act as rapid absorbents of almost all gases when heated to a high temperature. This temperature is above that at which exhausted glass vessels soften and collapse, and as glass is the only material that can be economically and satisfactorily employed for the containing vessels in cases where the highest vacuum is desired, I have invented means for heating the reagents in exhausted vessels made entirely of glass to a higher temperature than the melting point of glass for the purpose of producing high vacua in the manner before described. Vessels of porcelain or quartz are expensive and unreliable since they are apt to become porous in use, and they cannot be joined to the vessel to be exhausted and sealed therefrom after exhaustion by means of the blowpipe in the same way as glass vessels, and metal wires for carrying an electric current cannot be sealed air tightly into any other material except glass. Metal vessels cannot be employed in the production of high vacua for even if these are constructed entirely without joints or flaws of any kind, and are perfectly air-tight the gases condensed in the metal and evolved from it in vacua prevent a high vacuum being readily obtained therein. By my invention I have overcome the difficulty of the glass vessel collapsing at the high temperature employed, and by the use of glass vessels I can produce high vacua in a practical manner by means of reagents which do not act as absorbents of gases below the softening temperature of glass.

One of the reagents I may employ is the metal calcium. I have discovered that the metal calcium under suitable conditions absorbs rapidly and completely nearly all gases, including not only oxygen and nitrogen the two chief constituents of atmospheric air but also hydrogen, carbon dioxid, carbon monoxid, water vapor, acetylene, ammonia, sulfur dioxid, and even such a complex mixture as coal gas. The aforementioned condensed gases consist chiefly of compounds of hydrogen carbon and oxygen and are readily and completely absorbed by metal calcium. But metal calcium will not entirely absorb atmospheric air, for it will not absorb the argon which is present in air to the extent of about one per cent, nor while it is in the highly heated condition will it completely retain hydrogen. The metal calcium instead of being used alone may if desired be used in the form of alloys with other metal or metals, for example with magnesium, and I include in the term metal calcium alloys containing this metal. I have also discovered that the metals barium and strontium, which are in many respects the chemical equivalents of the metal calcium, may be used instead of, but in a similar manner to metal calcium in the production of high vacua, and in the following description it is to be understood that the metals barium and strontium or alloys containing these metals as aforesaid can be employed, and all these are to be understood to be included where metal calcium is mentioned.

I have devised a method whereby metal calcium can be used in the production of high vacua, which method consists in first removing the whole of the atmospheric air from the vessel being exhausted and afterwards employing heated metal calcium, to absorb the remaining gases, including the aforesaid gases after they have been expelled from the walls, or walls and contents, of the vessel while subjected to heat. The removal of the whole of the atmospheric air may be effected by replacement of the air with such gas, or gases, as is, or are, completely absorbed by heated metal calcium, either previously to, or during preliminary exhaustion.

The heating and expelling of the condensed and occluded gases may be effected in any usual, or suitable, manner of expelling condensed and occluded gases from the walls and contents of vessels being exhausted. The usual manner of effecting such an operation is to heat the vessel while it and its contents are subjected to the same treatment as they are subjected to in after use. In incandescent electric lamps for example an electric current is passed through the filament, and in X ray bulbs an electric discharge is passed between the electrodes during the continuation of the exhaustion.

The economical and rapid production of high vacua according to my invention can be effected as follows:—In communication with the vessel to be exhausted I place a receptacle for metal calcium, the said receptacle being provided with means for heating such metal calcium sufficiently to volatilize it, in the manner hereinafter to be described, means being also provided for placing the said vessel and receptacle in communication with a mechanical, or other, exhauster, and with a receptacle containing a substance which will generate gas capable of being entirely absorbed by heated metal calcium, and I first put the exhauster in communication with the vessel and receptacles and exhaust, as far as is possible by this means, air from the vessel and receptacles, and then I shut off the exhauster and generate the gas capable of being entirely absorbed by heated metal calcium as aforesaid, and I again exhaust by means of the exhauster, repeating this supply of such gas and exhaustion as may be necessary to replace and remove all the air, and consequently all the argon. I then shut off the vessel being exhausted and the receptacle containing the metal calcium from the exhauster and the receptacle containing the gas generating substance and keep the vessel and its contents heated and subjected to such treatment as hereinbefore indicated as will expel all condensed, and occluded, gases from the walls and contents of the said vessel, and I heat to the temperature at which it commences to volatilize the metal calcium which then absorbs all remaining gases and also the gases expelled as aforesaid. Instead of using a special substance to generate a gas, as aforesaid, for use in removing the air remaining after the preliminary exhaustion, the preliminary exhaustion may be continued while the vessel and its contents are subjected to such treatment as hereinbefore indicated as will expel the condensed and occluded gases, and the gases expelled from the vessels and contents of the said vessel be utilized instead of gases generated from a special substance as aforesaid, this being possible, for instance in the case of vessels and contents not previously exhausted.

Commercial samples of metal calcium give off gases, consisting mainly of hydrogen, carbon, and oxygen, when heated in a vacuum to a temperature below that at which these gases are absorbed by metal calcium, but these gases are reabsorbed on raising the temperature of the metal calcium. Use may be made of the gases evolved from metal calcium, in this way to assist in the replacement of the air remaining in the apparatus in the manner before described. This is possible in the case of a new charge of calcium not previously heated in a vacuum.

When the metal calcium has absorbed the remainder of the gases which have been expelled, the exhausted vessel may be sealed off and a very high and permanent vacuum has been obtained in a rapid and economical manner. Towards the end of the process of absorption of the gases by the metal calcium the temperature of the metal calcium can, with advantage, be reduced, for I have found that certain of the compounds formed by the combination of metal calcium with the gases it absorbs (and particularly the compounds with hydrogen and with carbon) possess an appreciable tension of dissociation at high temperature, but that on sufficiently lowering the temperature the gaseous products of dissociation are completely reabsorbed by the metal calcium, and the vacuum resulting is improved.

Figure 1 of the accompanying drawings illustrates diagrammatically means I may employ in carrying out the process according to my invention. A is the vessel to be exhausted, for example, an X ray bulb, B is the receptacle in which is the container of the metal calcium C, means being provided as at c, for heating it electrically to a high temperature as hereinafter described. D is the receptacle containing a substance which will furnish gas, or gases, capable of being entirely absorbed by metal calcium. This receptacle D may be, for example, a glass tube containing a mixture of, say, potassium chlorate and manganese dioxid furnishing oxygen on warming. E is the glass tube connected to the exhauster, not shown. F is a tap to open and close communication with the exhauster, and G is a tap to open and close communication with the receptacle D. H is a spectrum tube which may be of the usual kind and is a convenience for determining by means of the spectroscope the nature of the residual gases in the vessel undergoing exhaustion.

I will now describe constructions of apparatus suitable for use in carrying out that part of my invention which relates to the heating of the reagent to a high temperature in a glass containing vessel, for the purpose of causing it to absorb the remaining gases and so produce a high vacuum. For this purpose I employ, in combination with electrical means, as hereinafter described, for supplying heat to the reagent within the glass vessel, means for protecting the walls of the glass vessel from softening, or melting.

As the glass vessel is partially, or completely, exhausted, the conduction of heat from within outward to the walls is much diminished and in some cases I also interpose a shield, or shields, of refractory material between the reagent being heated in the said vessel and the walls of the said vessel to intercept heat radiated. The electrical heating is obtained by conduction of an electric current through a separate resistance circuit placed within the said exhausted glass vessel, or by electrical means situated outside the said glass vessel and causing induced electrical effect through the walls of the said glass vessel, either in a circuit composed of the reagent to be heated or in a separate circuit within the said exhausted glass vessel in close proximity to the reagent. For example, in one modification of my apparatus I employ a combination of an exhausted glass vessel with an electrical resistance circuit within the said glass vessel and surrounding the reagent to be heated and a shield, or shields, of refractory material placed between the said resistance circuit and the walls of the glass vessel, and in another modification I employ a combination of an exhausted glass vessel with a core of iron wires, or strips, inside the said vessel, and I dispose around the outside of the vessel a coil traversed by an alternating, or intermittent, current of high periodicity, and I place around the core a ring, or tube, composed of a good conductor of electricity in which the heating current is induced. This ring, or tube, may, in some cases for example in the case of metal calcium be made of the reagent to be heated, or of a separate substance on, or in, which the reagent to be heated is placed. In addition I may use with this combination a shield, or shields, of refractory material which, in this case, must be an insulator of electricity, between the substance heated and the walls of the glass vessel, and also I may use a shield between the substance heated and the iron core. When the heating current is induced directly in the substance to be heated, this substance is hotter than its surroundings, so that less heat is required than for any other mode of heating and the glass vessel needs less protection in this case and the shield, or shields, of refractory material may, in certain cases, be dispensed with.

Figure 7:
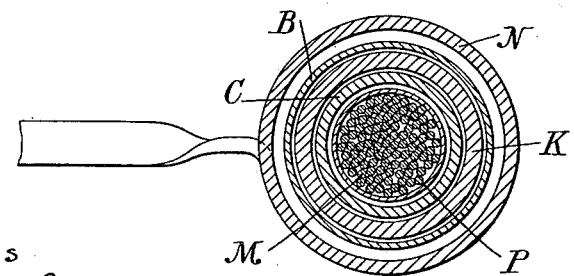

Figs. 2 to 5 represent a form of the apparatus according to the first mentioned modification, Figs. 3, 4, and 5 being respectively sections on the lines $x$, $y$ and $z$, Fig. 2. Figs. 6 and 7 show a form of the apparatus according to the second mentioned modification. Figs. 8 to 12 represent another modification as hereinafter described.

Referring first to Figs. 2 to 5. The glass vessel B is closed by a glass tube $B^2$ ground into the vessel B, and having two hollow legs, or pockets, $b$, filled with mercury into which penetrate the platinum conductors $b^2$ from the respective poles of any suitable source of electricity. I is a porcelain insulator through longitudinal holes in which pass the conductors $i\,i$, the lower ends of which dip into the mercury in the legs, or pockets, $b$ and passing within the porcelain tube J and out through holes $j\,j$ therein, and to the said conductors is joined an electrical resistance wire $i^2$ (of platinum, or other suitable material,) coiled round a helical groove on the porcelain tube J which is surrounded by a porcelain shield-tube K. Inside the tube J is carried the porcelain container L for the reagent C, which is to be heated. The upper enlarged part is employed when a reagent such as metal calcium is used which gives off a vapor which it is desirable to condense this enlarged part constituting a surface upon which the vaporized reagent will deposit. The shield-tube K serves to protect the glass of the vessel B from the heat radiated from the resistance wire $i^2$. If desired there may be more than one shield-tube of refractory and insulating material between the substance to be heated and the glass vessel B, or the glass vessel may be formed into a bulb at the part where the greatest heat is developed.

Refering to the modification shown in Figs. 6 and 7, this shows an arrangement adapted for use when the reagent, for example, metal calcium, is itself a conductor of electricity and can be made into suitable form. The substance to be heated is made into the form of a ring, or tube, C, which may be supported in a tube K constituting a shield of refractory and insulating material, in the glass vessel B. Within the substance C and this tube K are iron wires, or strips, M arranged after the manner of the core of an induction coil and contained in the tube P of thin glass, or porcelain. The ring, or tube, C is heated by an electric current induced in it either by a bobbin of insulated wire, or by spiral strips, as shown at N, traversed by an alternating, or intermittent, current of high periodicity and coiled outside the glass vessel B and therefore surrounding the iron core within it. This heating arrangement constitutes an alternate, or intermittent, current transformer of which the outside coilings N constitute the primary, the ring, or tube, C the single short-circuited winding of the secondary, and the iron wires, or strips, M the core. It may be convenient to obtain the alternating, or intermittent, current from a step-down transformer (not shown) of which N is the secondary and C is the tertiary. If necessary, in this case also, more than one shield K, may be used, or the shield K, (or shields), may, in some cases, be dispensed with as explained, and the outer glass tube at this part be expanded into a bulb, and the core M be made longer and the spiral N be placed above, or below, the bulb. The ring C in this case is conveniently supported on a projection on the tub K. When it is desirable to protect or inclose the core M the said core may, as shown, be contained in a sealed tube P of difficultly fusible glass, which, if necessary, may be protected externally by wrapping round it a sheet of mica, or other refractory material, or by placing round it a concentric shield of porcelain. With this method of heating, the limitation of temperature is fixed mainly by the loss of the magnetic properties of the iron core above a certain temperature, so that for very high temperatures the iron as well as the glass walls must be shielded. For the purpose of charging and cleaning the apparatus, the glass vessel B may, if desired, be made in two, or more, parts ground to fit together accurately without leakage when the ground joint is lubricated with rubber grease in the usual manner.

Figure 8:
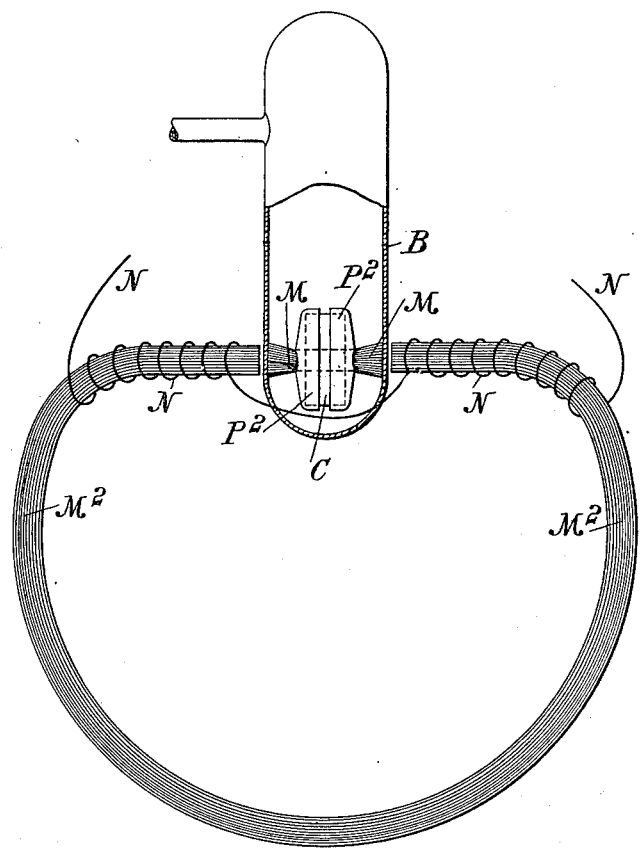
Figure 9:
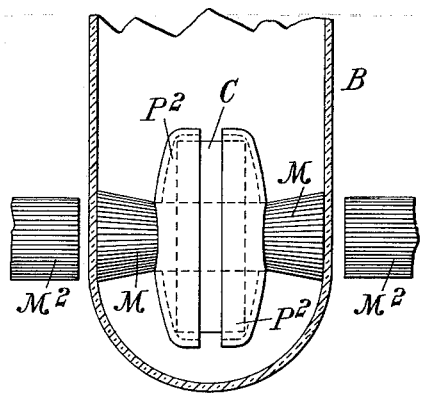
Figure 10:
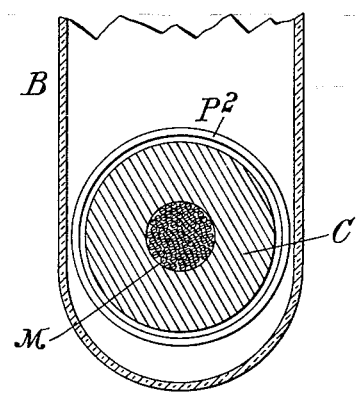
Figure 11:
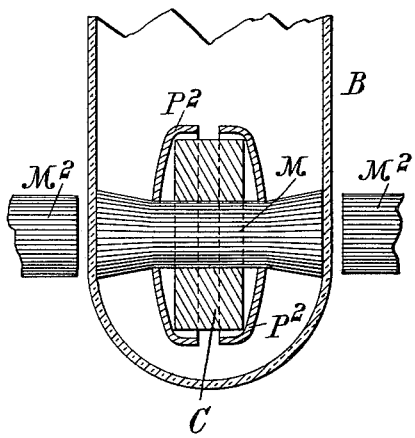
Figure 12:
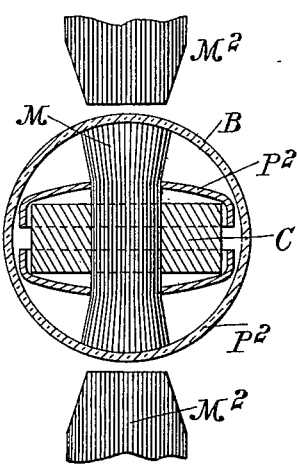

Fig. 8 represents a $\frac{1}{2}$ scale modification of the apparatus for use in the inductive method of heating upon the same principle as that last described. Fig. 9 is a section actual size of a part of the apparatus. Fig. 10 is a central transverse section; Fig. 11 a section at right angles thereto and Fig. 12 a horizontal section. The reagent, for example, metal calcium, is in the form of a disk C with a central hole through which a magnetic material such as a bundle of iron wires, or strips, M, passes the said wires, or strips, supporting the disk C, centrally, in the glass vessel B. Outside the glass vessel B is a magnetic material such as a bundle of iron wires, or strips, $M^2$, bent into approximately ring form and so arranged that it forms, with the iron wires, or strips, M, or the equivalent, inside the glass vessel B a magnetic circuit with two air gaps in which part of the walls of the glass vessel B are situated. A conductor N, of copper, or other suitable metal, is coiled around the outer wires, or strips, $M^2$, and through this is passed a rapidly alternating, or intermittent, electric current so as to induce a magnetic flux in the magnetic ring and consequently in the bundle of wires, or strips, M, or the equivalent, within the glass vessel B, and so heat the disk C. The disk C may if desired be made of a good conductor, for example, copper, and the reagent heated in a cavity in the same. Or, two disks of copper and a disk of the reagent placed between the other two disks may be employed. The drawing shows two caps, or shields, $P^2$ of porcelain, or other sufficiently refractory material which is a bad conductor of heat, these caps, or shields, being used to protect the walls of the glass vessel B from the heat generated in the disk C.

Having now particularly described and ascertained the nature of my said invention and in what manner the same is to be performed, I declare that what I claim is:—

1. The process of producing high vacuum which consists in bringing a heated alkaline earth metal capable of absorbing gas into the presence of a rarefied atmosphere whereby the remaining gases are absorbed.

2. The process of producing high vacuum which consists in subjecting a vessel to preliminary exhaustion, expelling the condensed and occluded gases from the walls of the vessel and bringing said gases into the presence of a heated alkaline earth metal capable of absorbing gas.

3. The process of producing high vacuum which consists in subjecting a vessel to preliminary exhaustion, expelling the condensed and occluded gases from the walls and contents of the vessel, and bringing said gases into the presence of a heated alkaline earth metal capable of absorbing gas.

4. The process of producing high vacuum which consists in subjecting a vessel to preliminary exhaustion, expelling the condensed and occluded gases from the walls of said vessel, bringing said gases into the presence of a heated alkaline earth metal capable of absorbing gas and permitting said metal to cool, substantially as described.

5. Apparatus for the purpose of producing high vacuum by heating in an exhausted glass vessel to a temperature above the softening point of glass any reagent which becomes an absorbent of gases at high temperature, the said apparatus consisting of the combination of a glass vessel adapted to be exhausted, means for supporting therein the reagent and means for electrically heating such reagent within the vacuum and means for preventing the intense heat being conveyed to the walls of the said glass vessel, substantially as hereinbefore described.

6. Apparatus for the purpose of producing high vacuum by heating in an exhausted glass vessel to a temperature above the softening point of glass any reagent which becomes an absorbent of gases at high temperature, the said apparatus consisting of the combination of a glass vessel adapted to be exhausted, means for supporting therein the reagent to be heated and means for heating such reagent within the vacuum by means of an electric current passing through a conductor external to the glass vessel and inductively heating the aforesaid reagent by current, and means for preventing the intense heat being conveyed to the walls of the glass vessel, substantially as hereinbefore described.

In testimony whereof I have signed this specification in the presence of two subscribing witnesses.

FREDERICK SODDY.

Witnesses:
 THOMAS D. MACKENZIE,
 ARTHUR J. BERRY.